United States Patent [19]
Foster et al.

[11] Patent Number: 6,121,967
[45] Date of Patent: Sep. 19, 2000

[54] METHOD AND APPARATUS FOR CONTROLLING MEDIA BAYS IN A COMPUTER SYSTEM

[75] Inventors: Derek J. Foster, San Jose; Michael G. Lum; Michael E. Larson, both of Sunnyvale, all of Calif.

[73] Assignee: Apple Computer, Inc., Cupertino, Calif.

[21] Appl. No.: 09/129,469

[22] Filed: Aug. 4, 1998

Related U.S. Application Data

[60] Provisional application No. 60/084,030, May 4, 1998.

[51] Int. Cl.$^7$ ......................................................... G06F 3/00
[52] U.S. Cl. .......................... 345/348; 345/967; 345/970
[58] Field of Search ...................... 345/339, 347, 345/348, 349, 352, 353, 354, 967, 969, 970

[56] References Cited

U.S. PATENT DOCUMENTS

| | | |
|---|---|---|
| 5,210,855 | 5/1993 | Bartol . |
| 5,317,697 | 5/1994 | Husak et al. . |
| 5,323,291 | 6/1994 | Boyle et al. . |
| 5,386,567 | 1/1995 | Lien et al. . |
| 5,444,644 | 8/1995 | Divjak . |
| 5,463,261 | 10/1995 | Skarda et al. . |
| 5,473,499 | 12/1995 | Weir . |
| 5,515,515 | 5/1996 | Kennedy et al. . |
| 5,526,493 | 6/1996 | Shu . |
| 5,548,782 | 8/1996 | Michael et al. . |
| 5,564,024 | 10/1996 | Pemberton . |
| 5,594,873 | 1/1997 | Garrett . |
| 5,594,874 | 1/1997 | Narayanan et al. . |
| 5,608,877 | 3/1997 | Sung et al. . |
| 5,617,526 | 4/1997 | Oran et al. ........................... 345/348 X |
| 5,640,176 | 6/1997 | Mundt et al. ........................ 345/348 X |
| 5,664,119 | 9/1997 | Jeffries et al. . |
| 5,691,742 | 11/1997 | O'Connor et al. ....................... 345/116 |
| 5,721,838 | 2/1998 | Takahashi et al. . |
| 5,737,185 | 4/1998 | Morrison et al. ........................ 361/685 |
| 5,786,984 | 7/1998 | Bonardi et al. ......................... 361/686 |
| 5,809,449 | 9/1998 | Harper ...................................... 702/63 |
| 5,822,582 | 10/1998 | Doragh et al. ............................... 713/2 |
| 5,949,979 | 9/1999 | Snow et al. . |

OTHER PUBLICATIONS

Wilson, Ron; "PicoPower eyes hot–docking," Electronic Engineering Times No. 858, p. 14, Jul. 24, 1995.

Morgenstern, David; "Power catches PCI wave with new line of clones," MacWeek, vol. 9, No. 36, Sep. 11, 1995.

*Primary Examiner*—Raymond J. Bayerl
*Assistant Examiner*—Cao H. Nguyen
*Attorney, Agent, or Firm*—Beyer Weaver & Thomas, LLP

[57] ABSTRACT

Improved techniques for controlling multiple media bays (expansion bays) of a computer system are disclosed. Status information (and possibly one or more control operations) for devices in media bays of a computer system can be displayed, for example, to identify devices that occupy the media bays and to indicate the removability of those devices. Software locks discourage a user from improper removal of media bay devices in a multiple media bay computer system. The software locks work not only during hot removal of locked media bay devices but also removal of locked media devices during a sleep state of the computer system. Also, a centralized media bay data storage area can be provided as well as a media bay driver for each media bay to permits easy access to information pertaining to the one or more media bays of the computer system. The centralized media bay data storage area can store information describing the current configuration of the media bays, including the number of media bays, contents of each media bay, etc.

14 Claims, 10 Drawing Sheets

METHOD AND APPARATUS FOR CONTROLLING MEDIA BAYS IN A COMPUTER SYSTEM

CROSS-REFERENCE TO RELATED APPLICATION

This application claims the benefit of U.S. Provisional Application No. 60/084,030, entitled "METHOD AND APPARATUS FOR CONTROLLING MEDIA BAYS IN A COMPUTER SYSTEM", and filed on May 4, 1998 pending, the disclosure of which is incorporated herein by reference for all purposes.

BACKGROUND OF THE INVENTION

1. Field of the Invention

The present invention relates to computing devices and, more particularly, to computing devices supporting one or more media or expansion bays.

2. Description of the Related Art

Portable computing systems often include one or more media bays for adding additional resources to the systems. These additional resources can, for example, be a floppy drive, a Compact-Disc (CD) drive, a hard drive, a Digital Video Disc (DVD) drive, a modem, a sound device, or a battery. Media bays are also known as expansion bays.

Problems result when a user removes a resource that is in use from a media bay. In the case of data storage device or data transfer devices, the removal of a resource that is in use can lead to lost or corrupted data. Even when the data storage device or the data transfer device is not actually being physically used when the resource is removed, often the resource is available for use by the computer system. In such cases, data can also be lost or damaged by the removal of the resource.

Conventionally, a user of a computer system could be informed by a Light Emitting Diode (LED) that a floppy drive or a disk drive was in use. Hence, the LED informed the user that the media (e.g., disc) in the drive should not be removed because it is physically using the media. Likewise, LEDs have been used to inform a user that removable drives should not be removed from media bays while physically in use. One problem is that it is not uncommon for users to ignore the LED indications. Another problem is that some media bays do not support or provide such LEDs.

Software locks have also been used with computer system having a single media bay. However, the problem with such conventional software locks is that they handled on a single media bay. More recent computer systems often include two or more media bays. A problem with the conventional software locks is that they do not support computer systems having multiple media bays.

Thus, there is a need for improved ways to inform and dissuade users from improperly removing removable devices from media bays of computer systems.

SUMMARY OF THE INVENTION

Broadly speaking, the invention relates to improved techniques for controlling media bays, expansion bays or slots of a computer system.

One aspect of the invention concerns displaying status information (and possibly one or more control operations) for devices in media bays of a computer system. In one embodiment, the status information includes an icon and menus that are displayed to identify devices that occupy the media bays and to indicate the removability of the devices that occupy the media bays.

Another aspect of the invention concerns techniques for encouraging against incorrect removal of media bay devices. In general, the techniques operate to halt processing and to inform the user that they have removed a "locked" media bay device which should be reinserted to prevent possible data loss. One embodiment of this aspect of the invention uses a software lock in a multiple media bay computer system that requires the reinsertion of the media bay device before processing can continue. The software lock works not only during hot removal of locked media bay devices but also removal of locked media devices during a sleep state of the computer system.

Still another aspect of the invention concerns techniques for controlling multiple media bays in a computer system. The invention provides a media bay driver for each media bay and a centralized media bay data storage area. The centralized media bay data storage area is available for use by not only each of the media bay drivers but also other software applications or processes. The centralized media bay data storage area stores information describing the current configuration of the media bays, including the number of media bays, contents of each media bay, etc.). Accordingly, the centralized media bay data storage area permits easy access to information pertaining to the one or more media bays of the computer system.

The invention can be implemented in numerous ways, including as a system, an apparatus, a method, or computer readable medium. Several embodiments of the invention are summarized below.

As a method for indicating device status for slots of a computer system, an embodiment of the invention includes the acts of: determining whether the slots of the computer system are occupied by devices; determining whether the slots are associated with a locked state; and displaying an icon on a display screen of the computer system, the icon being based on whether the slots are occupied and whether the slots are associated with the locked state.

As a method for monitoring improper removable of devices from slots of a computer system, an embodiment of the invention includes the acts of: determining when at least one locked device is removed from the slots of the computer system; displaying an alert message on a display screen of the computer system when it is determined that at least one locked device has been removed from the slots of the computer system; halting general processing of the computer system until the at least one locked device that has previously been removed from the slots of the computer system is reinserted; and thereafter determining whether another one of the locked devices has also been removed from the slots of the computer system, and if so continuing the halting until the another one of the locked devices that has previously been removed from the slots of the computer system is also reinserted.

In a computer system having at least one expansion bay for receiving a device, an embodiment of the invention pertains to a software arrangement that includes: a expansion bay driver for each of the expansion bays of the computer system, a expansion bay data structure for each of the expansion bays of the computer system, and a central expansion bay data structure. The central expansion bay data structure being stored at a known location in the computer system and including at least pointers to the expansion bay data structure for each of the expansion bays.

As a computer readable medium containing program code for indicating device status for slots of a computer system, the computer readable medium comprising: program code for determining whether the slots of the computer system are occupied by devices; program code for determining whether the slots are associated with a locked state; and program code for displaying an icon on a display screen of the computer system, the icon being based on whether the slots are occupied and whether the slots are associated with the locked state.

As a computer readable medium containing program code for monitoring improper removable of devices from slots of a computer system, the computer readable medium comprising: first program code for determining when at least one locked device is removed from the slots of the computer system; second program code for displaying an alert message on a display screen of the computer system when the first program code determines that at least one locked device has been removed from the slots of the computer system; third program code for halting general processing of the computer system until the at least one locked device that has previously been removed from the slots of the computer system is reinserted; and fourth program code for determining whether another one of the locked devices has also been removed from the slots of the computer system, and if so continuing the halting by the third program code until the another one of the locked devices that has previously been removed from the slots of the computer system is also reinserted.

The invention has various advantages depending on the aspects of the invention being implemented. One advantage of the invention is that a user is provided with improved visual and textual notifications as to the status of the one or media bays of a computer system. Another advantage of the invention is that processing by the computer system is halted when a user improperly removes devices in a locked condition from media bays. Still another advantage of the invention is that control over multiple media bays is facilitated by providing multiple media bay drivers and a centralized location for media bay status information.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to improved techniques for controlling multiple media bays of a computer system are disclosed. The media bays are expansion bays of a computer system and serve to additional resources to the computer system.

Embodiments of the invention are discussed below with reference to FIGS. 1A–7. However, those skilled in the art will readily appreciate that the detailed description given herein with respect to these figures is for explanatory purposes as the invention extends beyond these limited embodiments.

One aspect of the invention concerns displaying status information (and possibly one or more control operations) for devices in media bays of a computer system. In one embodiment, the status information includes an icon and menus that are displayed to identify devices that occupy the media bays and to indicate the removability of the devices that occupy the media bays.

Figure 1A:
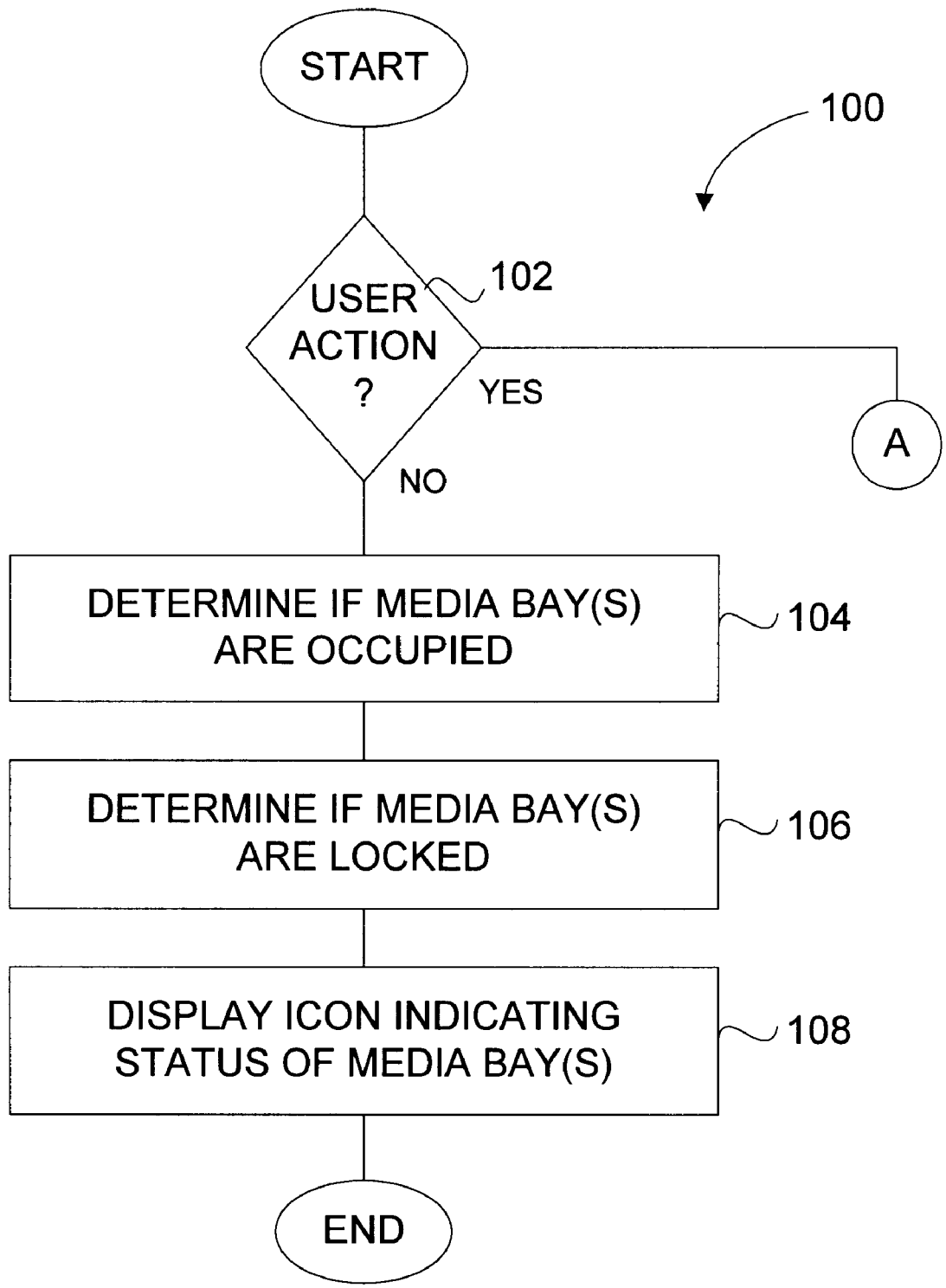
FIGS. 1A–1C are flow diagrams of icon and menu processing according to an embodiment of the invention.
Figure 1B:
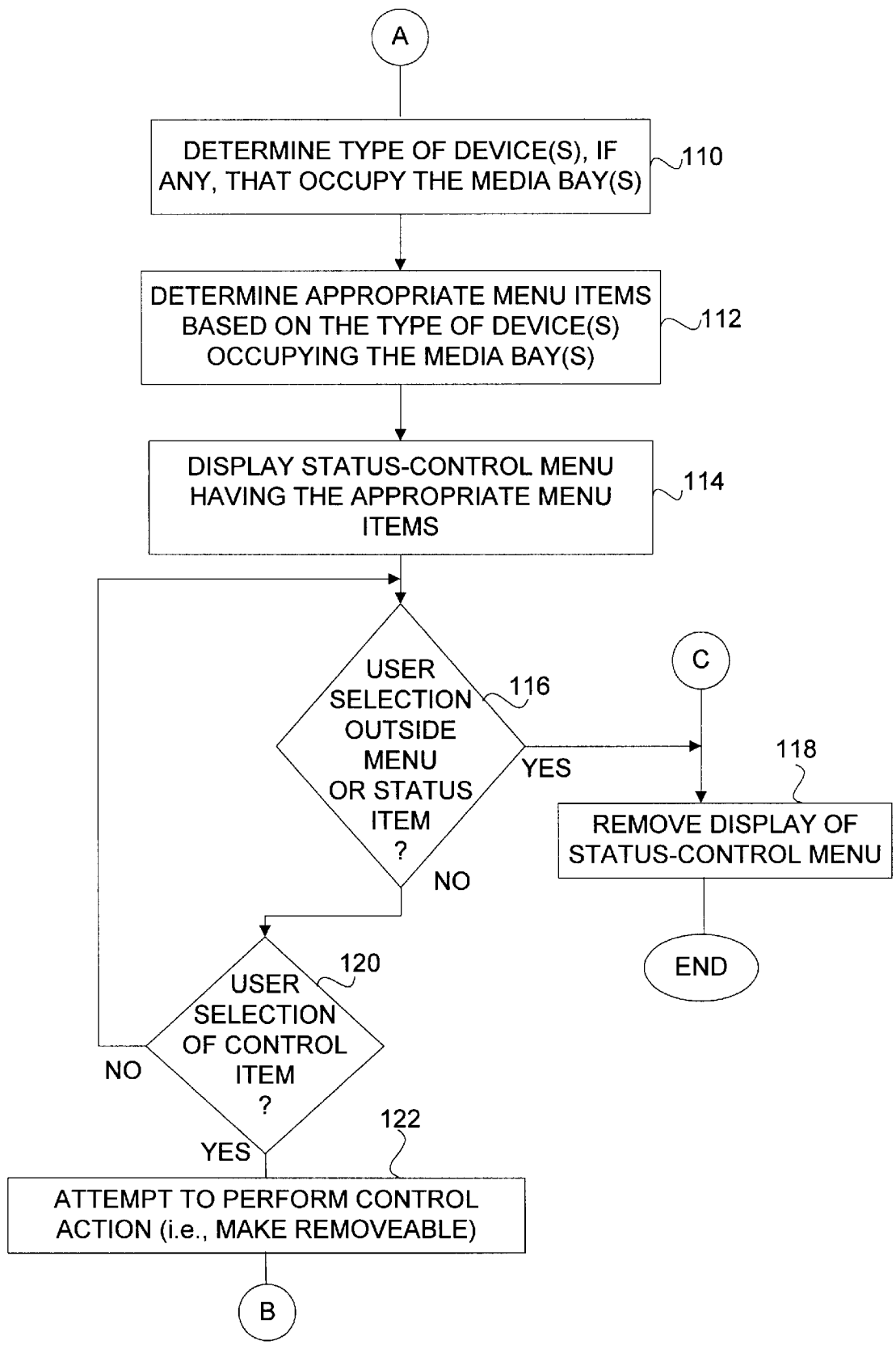
Figure 1C:
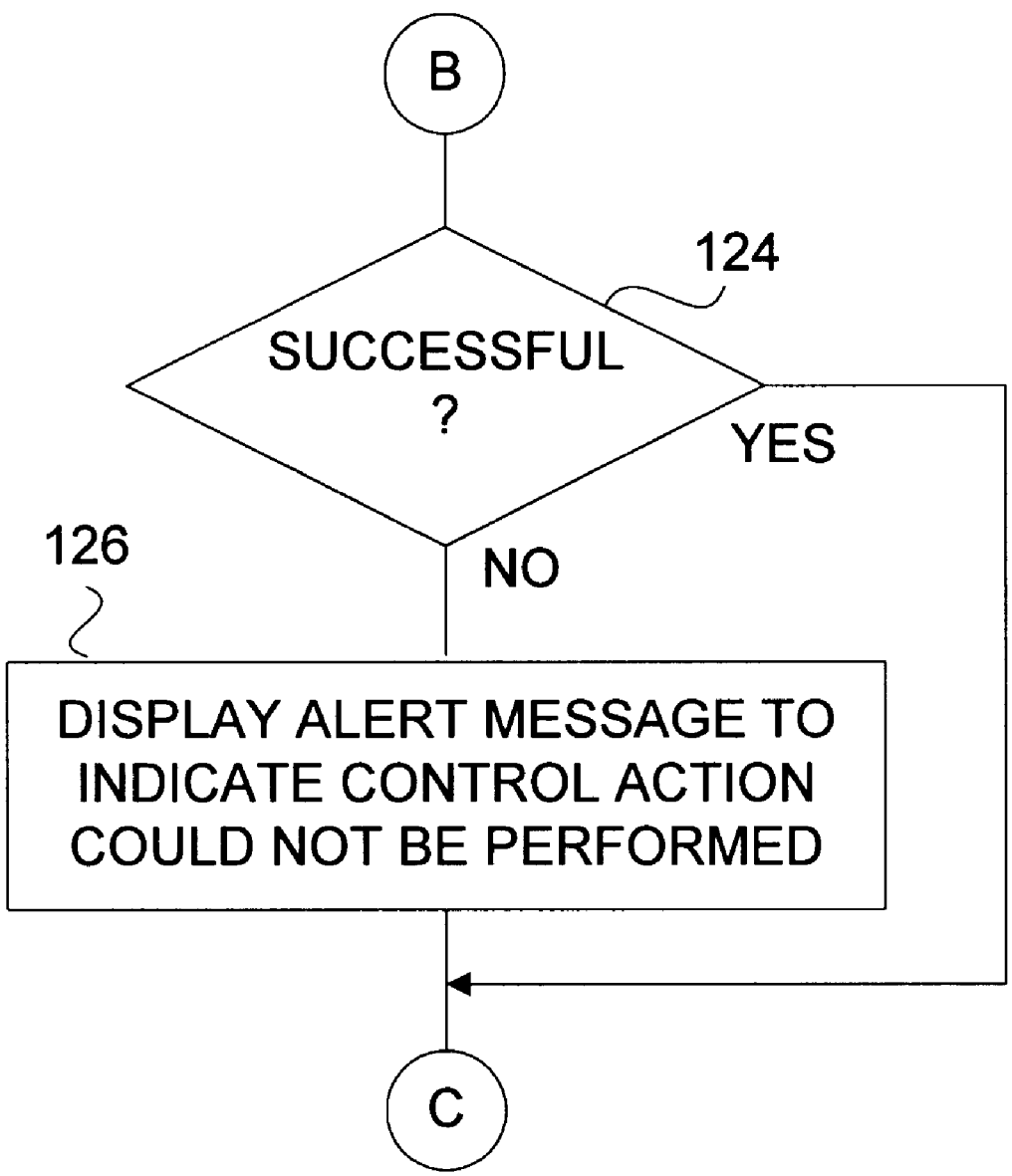

FIGS. 1A–1C are flow diagrams of icon and menu processing 100 according to an embodiment of the invention. The icon and menu processing 100 is processing that is performed to produce and manage icons and menus that are displayed on a display device of a computer system. The icons and menus pertain to media bays of a computer system and provide a user of the computer system with a visual indication of the status of the media bays as well as the ability to perform a control operation with respect to the media bays.

The icon and menu processing 100 is initiated either by user action or by a periodic timing event. In either case, the icon and menu processing 100 describes processing for each of the different types of events that can initiate the icon and menu processing 100.

The icon and menu processing 100 begins with a decision block 102. The decision block 102 determines whether user action has initiated the processing. When the decision block 102 determines that user action did not initiate the processing, then the icon and menu processing 100 was initiated by a periodic event. In such case, the icon and menu processing 100 determines 104 whether the one or more media bays of the computer system are occupied. Here, the icon and menu processing 100 will determine 104 whether each of the media bays supported by the computer system is being occupied by a device. Next, for those of the media bays that are determined to be occupied, the icon and menu processing 100 determines 106 whether those media bays are locked. A media bay is deemed to be locked if the media of the device in the media bay is mounted by an operating system of the computing system. For example, a floppy drive device would be considered locked if a floppy disk was inserted into the floppy drive and registered with and available to the operating system of the computer system. Next, an icon is displayed 108 to indicate the status of the media bays. More particularly, the icon is displayed on a display screen of the computer system to inform the user of the status of the media bays of the computer system. Here, in this embodiment, the status of the media bays are determined by blocks 104 and 106 which determine whether the media bays are occupied and if so whether they are locked. Then, in block 108 the appropriate icon is displayed to visually indicate to the user the status of the media bays. Following block 108, the icon and menu processing 100 is complete and ends for the case where the periodic event triggered the icon and menu processing 100.

On the other hand, when the decision block 102 determines that user action has initiated the icon and menu processing 100, then substantially different processing is performed by the icon and menu processing 100.

Specifically, when the decision block 102 determines that user action initiated the processing, then the processing is as follows. Initially, the type of devices, if any, that occupy the media bays are determined 110. As examples, the types of devices include a floppy drive, a hard drive, a CD-ROM drive, a DVD drive, or a battery. Once the types of devices occupying the media bays are determined 110, then appropriate menu items for a status-control menu are determined 112 based on the types of devices occupying the media bays. In one embodiment, the status-control menu contains a menu item for each of the media bays. Next, the status-control menu having the appropriate menu items is displayed 114 on the display screen of the computer system. The menu items are either status items or control items. Representative status-control menus are described below with reference to FIGS. 3B, 3D and 3F.

After displaying the status-control menu, the icon and menu processing 100 provides a decision block 116 that determines whether a user selection has been made outside the status-control menu area or on a status item of the status-control menu. Here, the icon and menu processing 100 awaits a user selection and subsequent processing differs depending on the user selection. If the decision block 116 determines that a user selection has occurred outside the status-control menu or on a status item of the status-control menu, then the display of the status-control menu is removed 118. Following block 118, the icon and menu processing 100 is complete and ends.

On the other hand, when the decision block 116 determines that the user selection has not occurred either outside the status-control menu area or on a status item, then a decision block 120 determines whether the user has selected a control item of the status-control menu being displayed. When the decision block 120 determines that the user has not selected a control item of the status-control menu, then the icon and menu processing 100 returns to complete the decision block 116 and subsequent blocks.

Alternatively, when the decision block 120 determines that the user selection of a control item of the status-control menu has occurred, the icon and menu processing 100 operates to attempt 122 to perform a control action associated with the control item selected by the user. For example, the control action could be to make removable the device currently occupying the media bay and having a locked state. Next, a decision block 124 determines whether the attempt 122 to perform the control action has been successful. If the attempt 122 to perform the control action has not been successful, an alert message to indicate that the control action could not be performed is displayed 126. On the other hand, when the decision block 124 determines that the attempt 122 to perform the control action has been successful, then the block 126 which displays the alert message is by-passed. Following block 126 as well as directly following the decision block 124 when the attempt 122 to perform the control action has been successful, the icon and menu processing 100 returns to repeat block 118 where the display of the status-control menu is removed and thereafter the icon and menu processing 100 is complete and ends.

Accordingly, the decision blocks 116 and 120 operate to provide a situation in which the icon and menu processing 100 awaits a user selection and depending upon the particular user selection, the processing operates differently. In particular, depending upon the particular user selection, the status-control menu is either immediately removed from the display without attempting any control actions or instead first attempts to perform a control action and then removes the status-control menu from the display.

Figure 2:
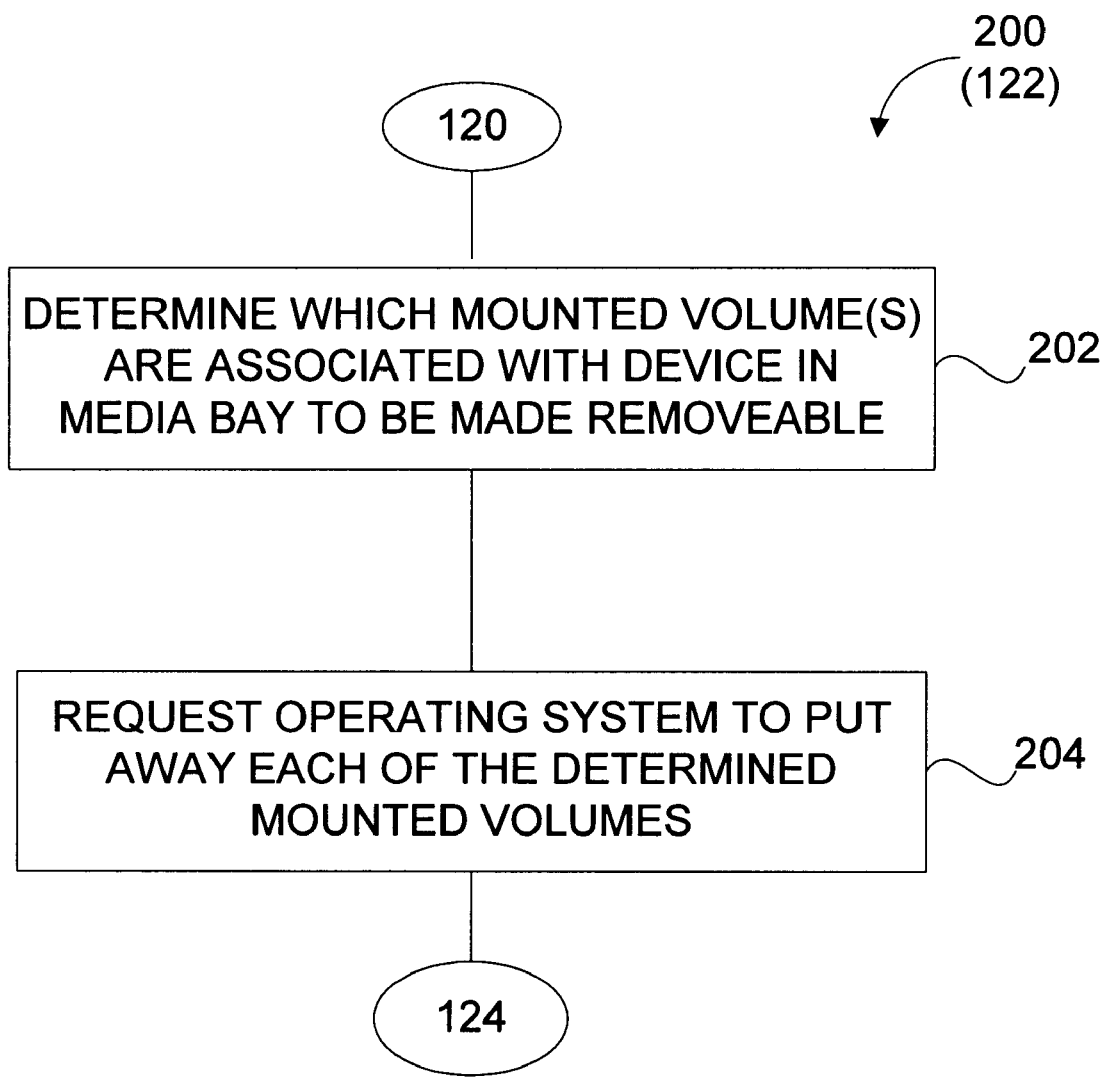
FIG. 2 is a flow diagram of device removal processing according to an embodiment of the invention.

FIG. 2 is a flow diagram of device removal processing 200 according to an embodiment of the invention. The device removal processing 200 is, for example, performed by block 122 in FIG. 1B. Specifically, the device removal processing 200 operates to make a device removable from the media bay that currently occupies the device. Initially, the device removal processing 200 determines 202 which mounted volumes are associated with the device presently in the media bay that is to be made removable. Then, the device removal processing 200 requests 204 the operating system to put away each of the determined mounted volumes. Following block 204, the device removal processing 200 is complete. Ordinarily, further icon and menu processing 100 would be performed such as returning to perform the decision block 124 in FIG. 1C.

According to the first aspect of the invention, an icon displayed to a user on the display screen provides status information about the media bays of the computer system. Additionally, a status-control menu can also be displayed to the user on the display screen to provide status information or control operations to the user with respect to the media bays of the computer system. Accordingly, a user of a computer system is able to be better informed as to the status of the media bays which reduces the likelihood of improper removal of devices from the media bays. A user is also able to easily invoke one or more control operations with respect to the media bays using the status-control menu.

In one embodiment, the icon and the status-control menu are associated with a control strip. Control strips are typically a collection of icons that are displayed by operating system or application programs so that user can invoke an action by a user selection or otherwise indicate status information to a user about certain aspects of the computer system. A common icon status indicator is a battery level icon that is displayed on a display screen of a battery-powered computer to indicate battery charge level to the user.

FIGS. 3A–3F are exemplary portions of a graphical user interface (GUI) presented to a user of a computer system according to an embodiment of the invention. These exemplary portions of the GUI that are displayed on the display screen are associated with a control strip used by a Macintosh Operating System from Apple Computer, Inc. of Cupertino, Calif. Specifically, according to the invention, these exemplary portions of the GUI illustrate a control strip that includes an icon associated with the media bays (i.e., media bay icon) to provide status information pertaining to the media bays and also includes a status-control menu containing status information and/or control actions for the media bays. The control strip includes numerous other icons that are associated with other aspects of the computer system besides the media bays. Although the media bay icon and the status-control menu provided in the exemplary portions of the GUI represent a computer system having two media bays, it should be recognized that the computer system can have one to several media bays depending on the design of the computer system. The control strips illustrated in FIGS. 3A–3F are described with reference to FIGS. 1A–1C below.

Figure 3A:
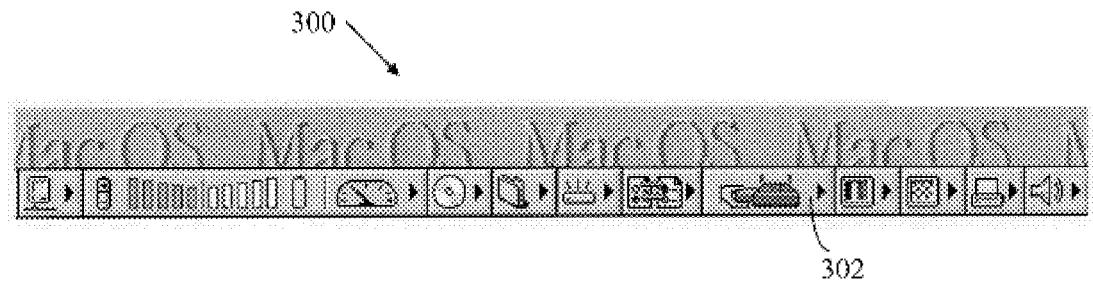
FIGS. 3A–3F are exemplary portions of a graphical user interface (GUI) presented to a user of a computer system according to an embodiment of the invention.

When the icon and menu processing 100 operates in block 108 to display an icon indicating the status of the media bays, the icon displayed can, for example, be icon 302 of the control strip 300 illustrated in FIG. 3A. The icon 302 shows that the left media bay is occupied and that the right media bay is unoccupied or available. The control strip 300 includes various other icons that provide status information or available controls to the user (e.g., color control, sound control, battery status).

Figure 3B:
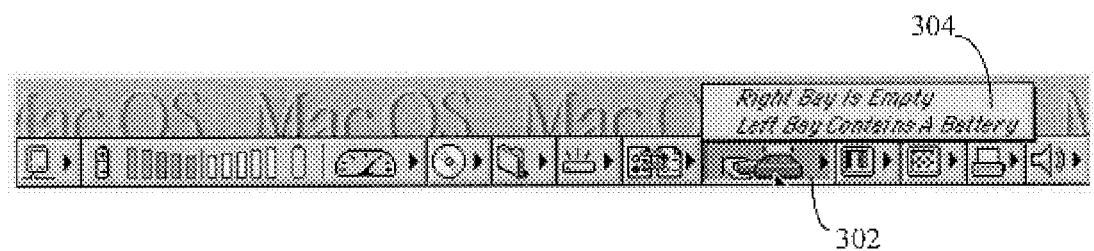

Then, if the user were to select the icon 302 (e.g., with a mouse click), then the decision block 102 would determine that the icon and menu processing 100 was invoked by a user action. In such case, the block 114 of the icon and menu processing 100 would display a status-control menu having menu items. In FIG. 3B, the icon 302 has an associated menu 304 that contain status information for each of the media bays. In particular, the menu 304 informs the user that the "Right Bay is Empty" and informs the user that the "Left Bay Contains A Battery". Hence, these menu items are based on the type of device (if any) occupying the media bays as determined in the blocks 110 and 112 of the icon and menu processing 100. After the user selects (e.g., mouse click) outside of the menu 304 or on either status item, the menu 304 is removed (block 118) from the display screen.

Figure 3C:
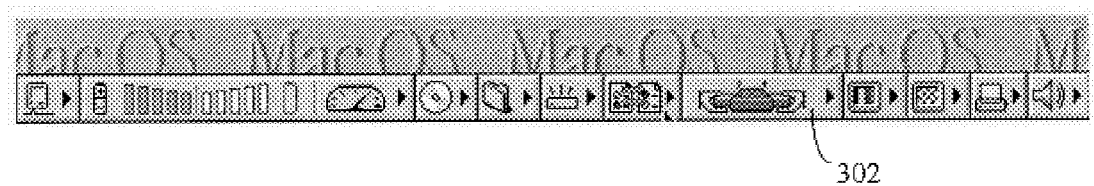

Thereafter, if the user were to insert a device into the right media bay, then the icon 302 would be updated as shown in FIG. 3C to reflect that both media bays are now occupied. Here, the icon and menu processing 100 would be initiated by a periodic event and the update to the icon 302 would be provided by block 108.

Figure 3D:
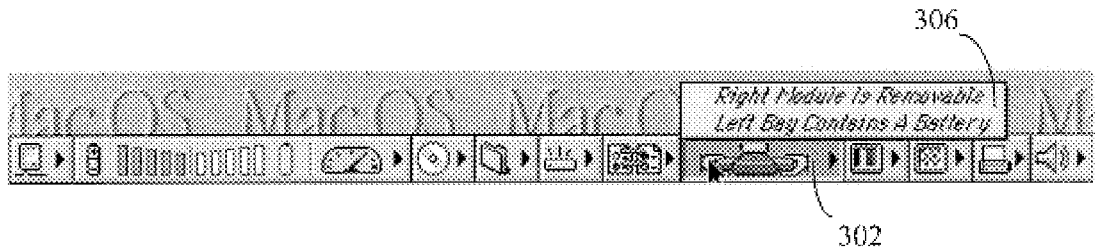

Then, if the user were to select the icon 302 (e.g., with a mouse click), then the decision block 102 would determine that the icon and menu processing 100 was invoked by a user action. In such case, the block 114 of the icon and menu processing 100 would display a status-control menu having menu items. In FIG. 3D, the icon 302 has an associated menu 306 that contain status information for each of the media bays. In particular, the menu 306 informs the user that the "Right Module is Removable" and informs the user that the "Left Bay Contains A Battery". Hence, these menu items are based on the type of device (if any) occupying the media bays as determined in the blocks 110 and 112 of the icon and menu processing 100. After the user selects (e.g., mouse click) outside of the menu 304 or on either status item, the menu 306 is removed (block 118) from the display screen.

Figure 3E:
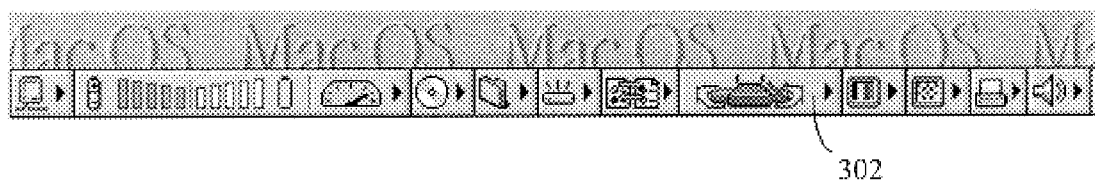

Further, the device in the right media bay is of a type that can be either removable or unremovable, and is illustrated in FIG. 3D as being removable. However, once the device in the right media bay becomes unremovable (e.g., due to the operating system mounting its media), the right media bay becomes unremovable. FIG. 3E illustrates the icon 302 in a manner that informs the user that the right media bay should not be removed. In FIG. 3E, the particular visual indicator of non-removability is a "X" on the right side of the icon 302, thus illustrating that the right media bay is locked.

Figure 3F:
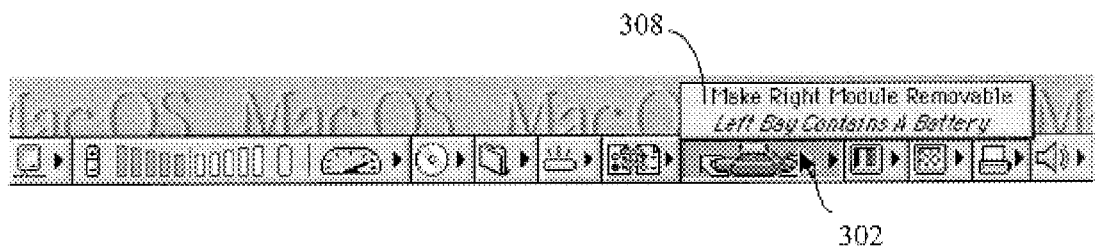

Thereafter, if the user were to select the icon 302 (e.g., with a mouse click), then the decision block 102 would determine that the icon and menu processing 100 was invoked by a user action. In such case, the block 114 of the icon and menu processing 100 would display a status-control menu having menu items. In FIG. 3F, the icon 302 has an associated menu 308 that contain status and control information for the media bays. In particular, the menu 308 provides a status item that informs the user that the "Left Bay Contains A Battery" and provides a selectable control item that enables the user to "Make Right Module Removable". These menu items are based on the type of device (if any) occupying the media bays as determined in the blocks 110 and 112 of the icon and menu processing 100. If the user were to select the selectable control item, then block 122 of the icon and menu processing 100 would attempt to perform the control action to render the device in the right media bay removable.

Additionally, it should be noted that within the menus 304, 306 and 308, the status items can be visually distinguished from the control items. For example, in the menus 304, 306 and 308, status items are displayed in italics, whereas control items are displayed without italics. Various other approaches (e.g., different fonts or colors) can be used to assist a user in visually distinguishing between the status items and the control items in the status-control menus being displayed.

Another aspect of the invention concerns techniques for encouraging against incorrect removal of media bay devices. In general, the techniques operate to halt processing and to inform the user that they have removed a "locked" media bay device which should be reinserted to prevent possible data loss. One embodiment of this aspect of the invention uses a software lock that requires the reinsertion of the media bay device before processing can continue. The software lock works not only during hot removal of locked media bay devices but also removal of locked media devices during a sleep state of the computer system.

Figure 4:
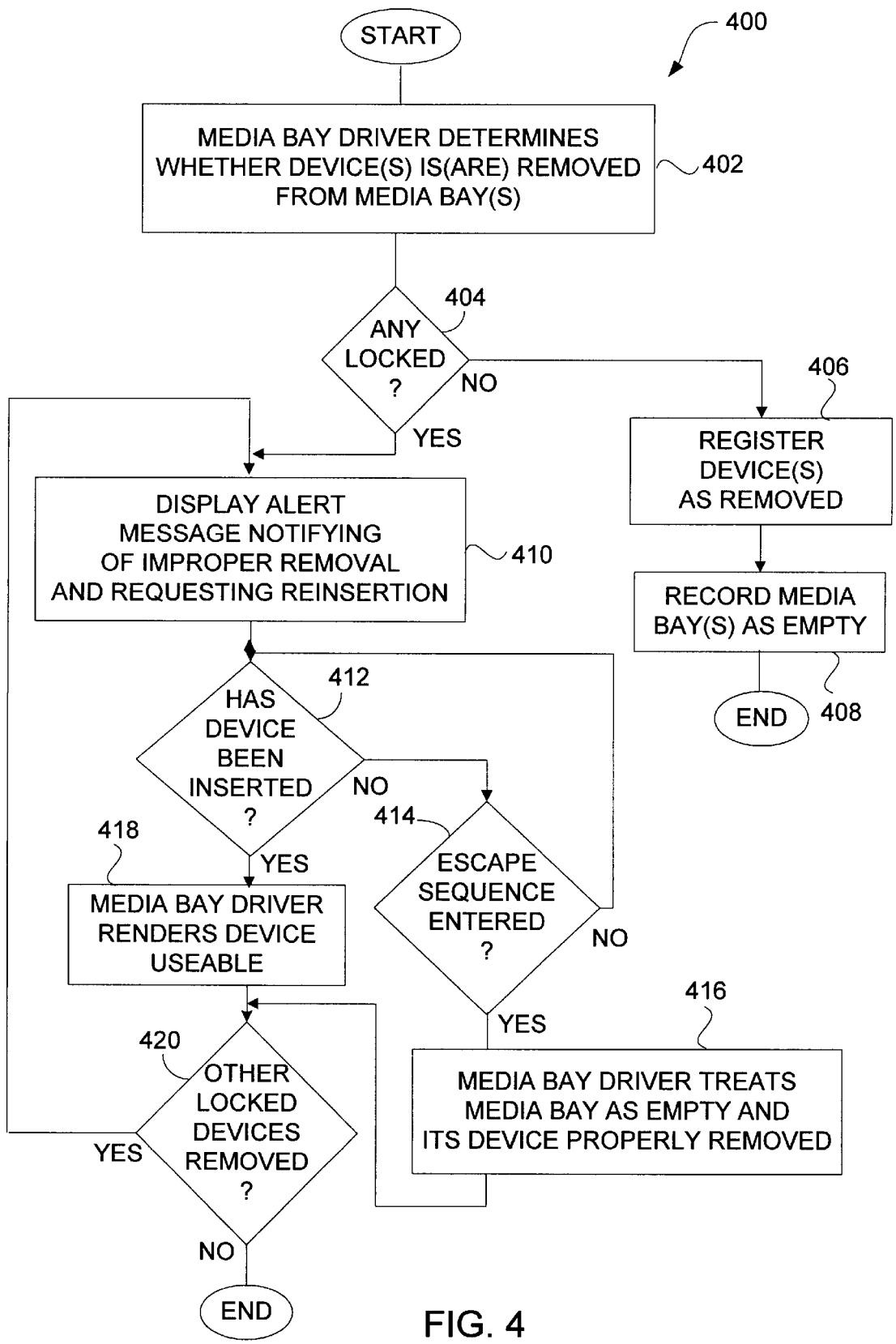
FIG. 4 is a flow diagram of software lock processing according to an embodiment of the invention.

FIG. 4 is a flow diagram of software lock processing 400 according to an embodiment of the invention. The software lock processing 400 provides a software lock as necessary to dissuade a user of the computer system from improperly removing one or more devices from one or more media bays that are in a locked state.

The software lock processing 400 initially determines 402 whether one or more devices have been removed from the media bays. Typically, this determination would be performed by or with the assistance of media bay drivers associated with the media bays. A computer system can have one or more media bays which can each receive a device. Hence, either one or a plurality of devices can be removed from the media bays at any given moment. Hence, the determination 402 of those of the devices that have been removed from the media bays can be one or more devices.

Next, a decision block 404 determines whether any of the devices that have been determined to have been removed were in a locked state. A device is considered locked when its media is mounted by the operating system. When the decision block 404 determines that none of the devices that have been removed were in the locked state, then there is no need for providing the software lock. In such case, the software lock processing 400 registers 406 the one or more devices as being removed from the respective one or more media bays. Next, the one or more media bays from which the devices were removed are recorded 408 as being empty. At this point, the one or more media bays are again available to receive other media bay devices. Following block 408, the software lock processing 400 is complete and ends.

On the other hand, when the decision block 404 determines that one or more of the devices that have been removed from the media bays were in a locked state, then the software lock processing 400 operates to provide a software lock for each of the media bays having a locked device removed therefrom. In particular, an alert message is displayed 410 on the display screen of the computer system. The alert message notifies the user of the improper removal of a device from a media bay as well as requests its reinsertion. In one embodiment, in the case where multiple locked devices have been removed, the alert message preferably pertains to the locked device last removed. Then, a decision block 412 determines whether the device that has been requested to be reinserted has been inserted. If the decision block 412 determines that the requested device has not been reinserted, then a decision block 414 determines whether an escape sequence has been entered. The escape sequence is, for example, a keyboard sequence entered by a user that instructs the software lock processing 400 to bypass the imposed software lock. Hence, when the decision block 414 determines that the proper escape sequence has been entered, then the media bay driver treats 416 the media bay as empty and the previously inserted device as being properly removed. Alternatively, when the proper escape sequence has not been entered, then the decision block 414 causes the software lock processing 400 to return to repeat the decision block 412 and subsequent blocks. Consequently, the software lock condition is provided by the decision block 412 which requires the requested device to be reinserted before the processing can continue. The exception to the software locking condition is provided by the decision block 414 which allows a user to enter an appropriate escape sequence to bypass the software locking condition.

In any case, once the decision block 412 determines that the requested device has been reinserted into the media bay, then the software lock condition is removed and processing is able to continue. Specifically, the media bay driver renders 418 the device that has been reinserted usable. Here, the device becomes usable just as it was before the device was improperly removed. Next, a decision block 420 determines whether any other locked devices were removed from the media bays. The decision block 420 thus is provided so that the software lock processing 400 can handle multiple media bays when devices are removed from the media bays in a substantially simultaneous manner. Hence, if the media bay for one device that has been reinserted becomes functional again, the software lock processing 400 must determine whether there are any other locked devices that have been removed from the other media bays of the computer system and, if so, returns to the block 410 of the software lock processing 400 so as to provide the software lock condition for another one of the devices that was improperly removed from another one of the media bays. Thus, the software lock condition is independently provided for each of the locked devices that are improperly removed from the media bays of the computer system.

However, once the decision block 420 determines that all locked devices that have been removed from the media bays have been processed in accordance with the software lock processing 400, then the software lock processing 400 is complete and ends. Further, it should be noted that following the block 416 in the case in which the appropriate escape sequence has been entered, the software lock processing 400 would perform the decision block 420 so that the lock condition for other improperly removed locked devices can be properly processed irrespective of the user entering the appropriate escape sequence associated with a different one of the removed locked devices.

The software lock processing 400 is generally activated whenever a device is removed from one of the media bays. When the computer system is active, the removal of a device immediately causes the software lock processing 400 to be invoked. Alternatively, when the computer system is asleep when the removal of a device from one of the media bays, then once the computer system wakes up the software lock processing 400 will be invoked. The software lock processing 400, namely block 402, could differ in that the media bay driver would check for devices in the media bays, and compare the devices present to the devices that were in the media bays when the computer system was put to sleep. If the devices are not the same, then the previously present devices are determined to have been removed.

Still another aspect of the invention concerns techniques for controlling multiple media bays in a computer system. The invention provides a media bay driver for each media bay and a centralized media bay data storage area. The centralized media bay data storage area is available for use by not only each of the media bay drivers but also other software applications or processes. The centralized media bay data storage area stores information describing the current configuration of the media bays, including the number of media bays, contents of each media bay, etc. Accordingly, the centralized media bay data storage area permits easy access to information pertaining to the one or more media bays of the computer system.

Figure 5:
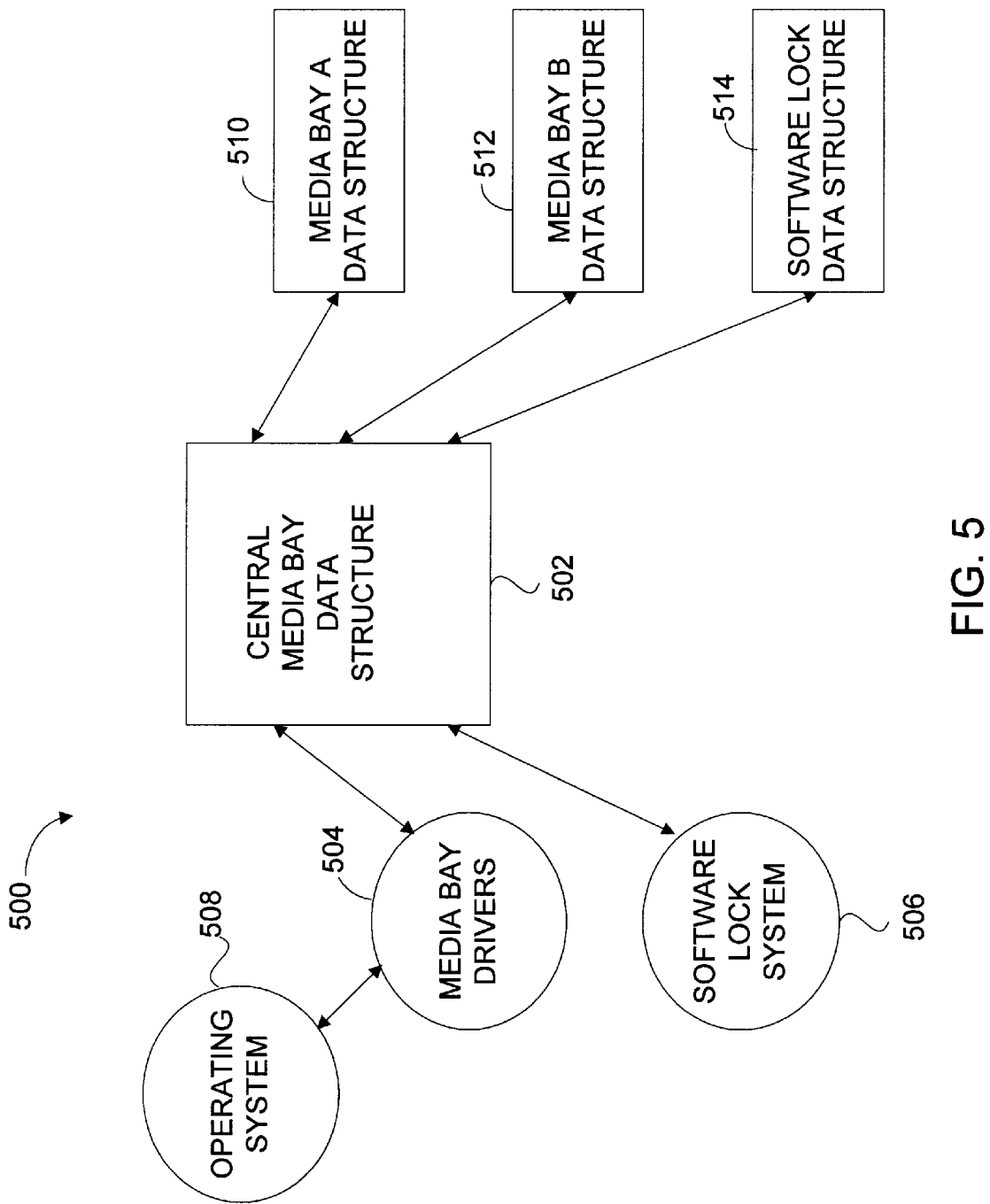
FIG. 5 is a diagram of a software system according to an embodiment of the invention.

FIG. 5 is a diagram of a software system 500 according to an embodiment of the invention. The software system 500 includes a central media bay data structure 502. The central media bay data structure 502 is a central storage area for media bay information. Various drivers and software processes are able to access and thus utilize the media bay information stored in the central media bay data structure 502. As illustrated in the embodiment shown in FIG. 5, media bay drivers 504 and a software lock system 506 can directly access the central media bay data structure 502. With a computer system having two media bays, the media bay drivers 504 would preferably include two separate media bay drivers. Also, an operating system 508 can indirectly access the central media bay data structure 502. The software system 500 also includes a media bay A data structure 510, a media bay B data structure 512, and a software lock data structure 514. The media bay A data structure 510 is maintained by the media bay driver 504 for the media bay A, and the media bay B data structure 512 is maintained by the media bay driver for the media bay B.

Examples of the information stored in the central media bay data structure 502 includes: number of media bays in system, flags indicating particular device types in the media bays, and pointers to data structures for media bay drivers and software lock system. Hence, in the described system with two media bays, the central media bay data structure 502 would store an indication that there are two media bays. The flags could indicate the presence of particular device types in the media bays (e.g., sound device, modem device, etc.). The pointers stored in the central media bay data structure 502 provide a central access point for each of the media bay A data structure 510, the media bay B data structure 512, and the software lock data structure 514.

The data structures for each of the media bays, e.g., the media bay A data structure 510 and the media bay B data structure 512, can store a variety of information for the associated media bay. For example, the data structured for a media bay can store information on: occupied/unoccupied, locked/unlocked, previous item in bay, and addresses of various registers. The data structure for a media bay can also store information on ATA device type when needed to assist the software lock system in determining whether the same type of device has been reinserted. Such additional information is helpful when the media bays work on bus types which would make particular ATA devices otherwise indistinguishable.

The software lock data structure 514 contains software lock information that is maintained by the software lock system 506. As an example, the software lock system 506 and the software lock data structure 514 are associated with the software lock processing 400 illustrated in FIG. 4. The centralized media bay data structure 502 facilitates the software lock system 506 (or other software processes) in obtaining access to information maintained by not only the centralized media bay data structure 502 but also information maintained in the media bay data structures 510 and 512.

Figure 6:
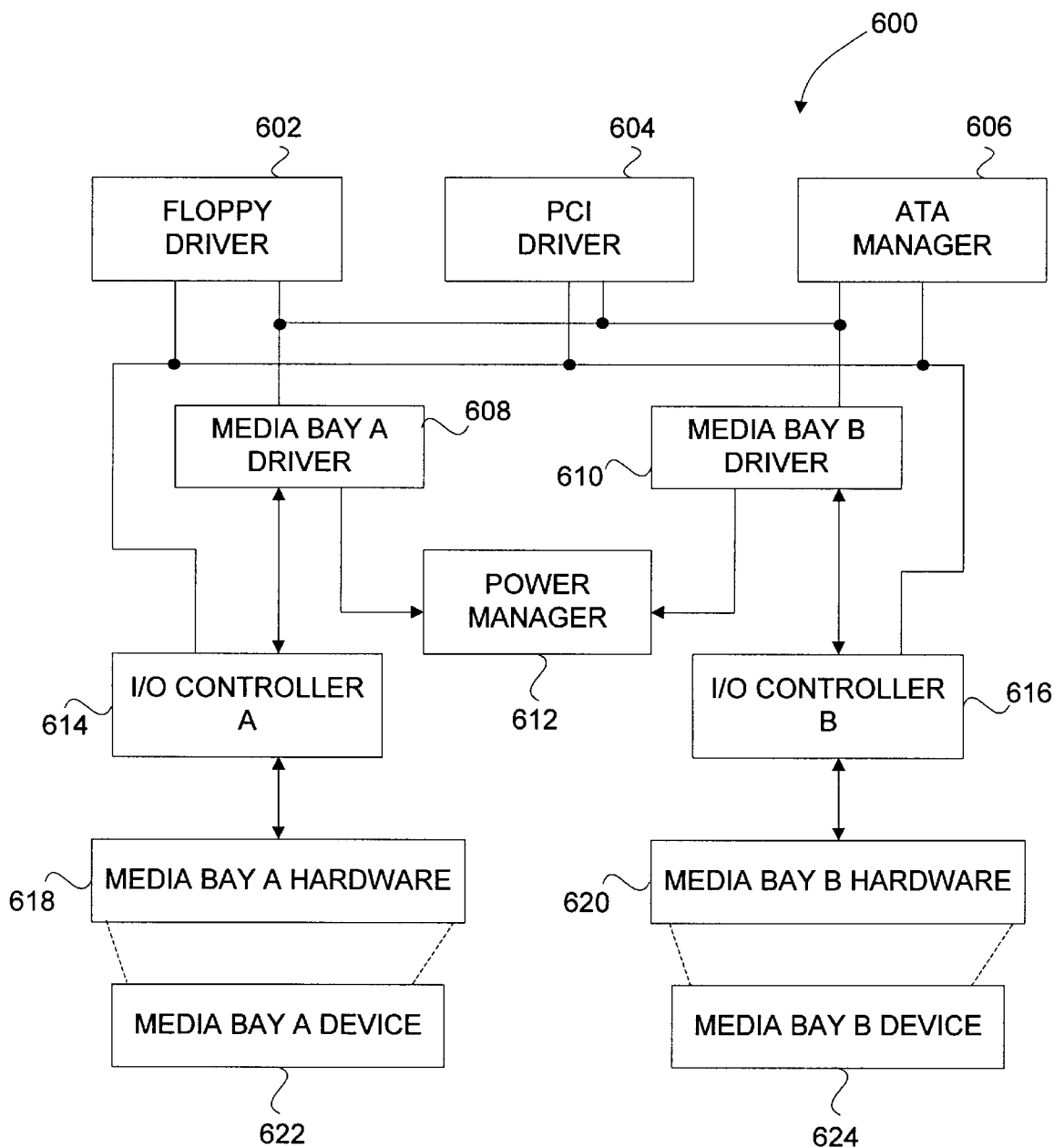
FIG. 6 is a schematic diagram of a media bay system according to an embodiment of the invention.

FIG. 6 is a schematic diagram of a media bay system 600 according to an embodiment of the invention. The media bay system 600 assumes a two media bay design, but can be used with one or more media bays. The media bay system 600 includes various device drivers for devices inserted into media bays. In particular, the device drivers in the media bay system 600 include a floppy driver 602 for use with a floppy drive device, a PCI driver 604 for use with a PCI device, and an ATA manager 606 for use with an ATA device. The drivers 602, 604 and 606 are each coupled to a media bay A driver 608 and a media bay B driver 610. The media bay drivers 608 and 610 are coupled to a power manager 612 that is capable of managing the power of the media bays.

The media bay system 600 also includes hardware components that are accessible using the various drivers 602–610. The hardware components of the media bay system 600 include an I/O controller A 614 and an I/O controller B 616. The I/O controller A 614 is coupled to the media bay A driver 608 and the other drivers 602–606, and the I/O controller B 616 is coupled to the media bay B driver 610 and the other drivers 602–606. The I/O controller A 614 is connected to a media bay A hardware 618, and the I/O controller B 616 is connected to media bay B hardware 620. The media bay A hardware 618 is capable of receiving a media bay A device 622. The media bay B hardware 620 is capable of receiving a media bay B device 624.

The media bay system 600 allows individual media bay drivers (608 and 610) to maintain status information on the respective media bays. The floppy driver 602, the PCI driver 604, and the ATA manager 606 interact with the operating system of the computer system and are able to access the status information on the media bays by accessing the media bay drivers 608 and 610. Additionally, data transfer between the computer system and the media bay devices 622 and 624 is performed using the associated media bay hardware and I/O controller and the appropriate one of the drivers 602–606.

Although the above discussion of the media bays and media bay devices was largely pertaining to data storage or data transfer devices, it should be understood that the media bay device could also be other types of devices. For example, the media bay device could be a battery. A battery would then be considered in a "locked" state when it is being used to power the computer system. The icon and menu processing 100 could display an icon indicating that a media bay is occupied by a battery and whether or not the media bay is considered to be locked. The menu items displayed to a user would also then pertain to the battery, such as the menu 306 in FIG. 3D. However, the software lock processing 400 would generally not be suitable for use with batteries as the media bay device because the removal of the battery causes the computer system to lose power.

Figure 7:
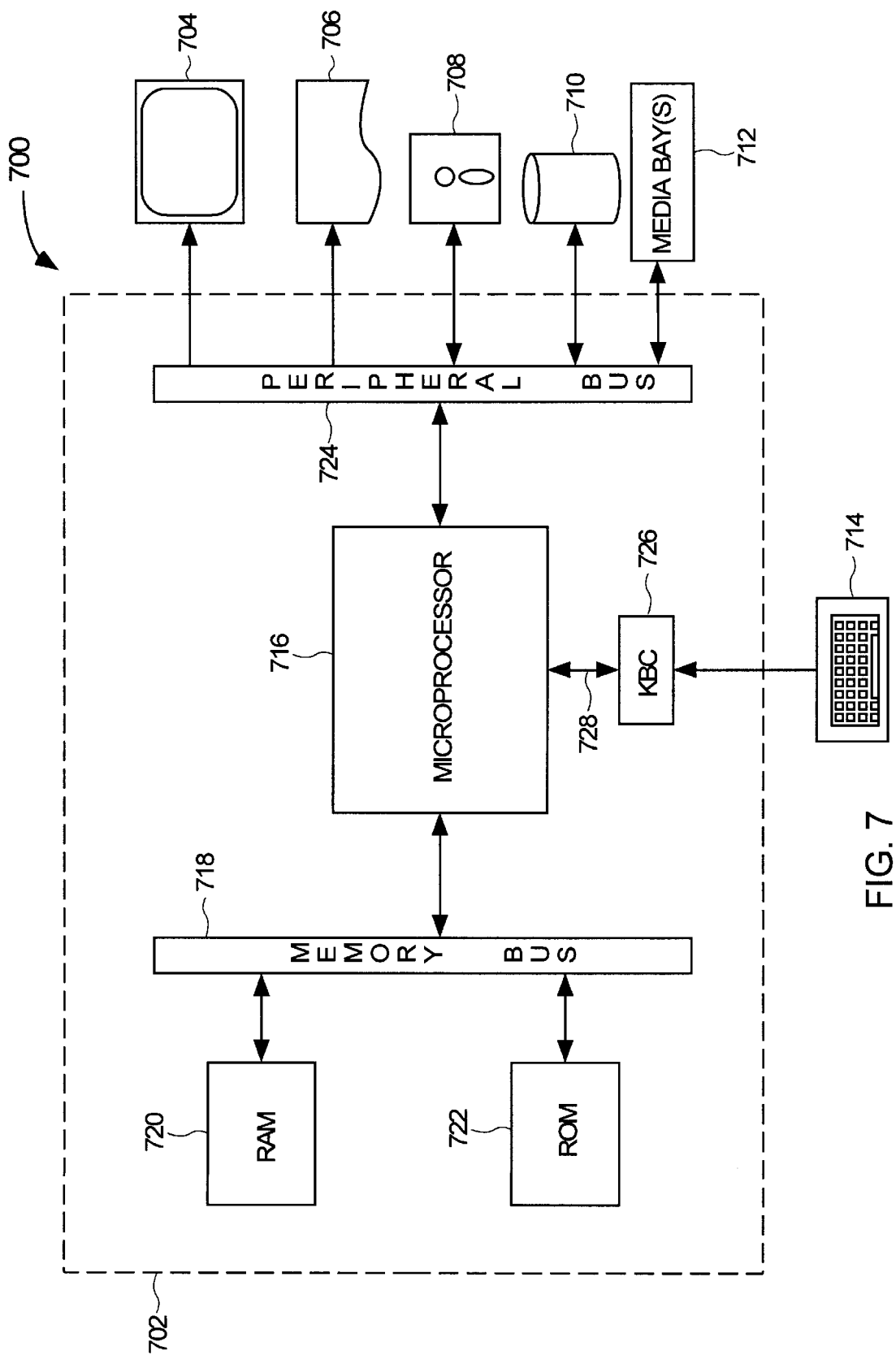
FIG. 7 is a block diagram of an exemplary computer system for use with the invention.

FIG. 7 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, media bay(s) 712, and a keyboard 714. The digital computer 702 includes a microprocessor 716, a memory bus 718, random access memory (RAM) 720, read only memory (ROM) 722, a peripheral bus 724, and a keyboard controller 726. The digital computer 702 can be a personal computer, a workstation computer, or some other type of computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, as described above, some particular functions of microprocessor 716 is to provide and display an icon and menu associated with the one or more media bays, and to implement software lock processing.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The RAM 720 also preferably stores the various data structures illustrated in FIG. 5. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the media bay(s) 712. The keyboard controller 726 is used to receive input from the keyboard 714 and send decoded symbols for each pressed key to the microprocessor 716 over bus 728.

The display screen 704 is an output device that displays images of data provided by the microprocessor 716 via the peripheral bus 724 or provided by other components in the computer system 700. The printer device 706 when operating as a printer provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 720. The computer code and data could also reside on a removable program medium and loaded or installed onto the computer system 700 when needed. Removable program mediums include, for example, CD-ROM, PC-CARD, floppy disk, magnetic tape, and a network component.

The one or more media bays (expansion bays) 712 are used to receive media bay devices (expansion bay devices) to provide greater resources to the computer system. As examples, the types of devices include a floppy drive, a hard drive, a CD-ROM drive, a DVD drive, or a battery. The media bays are accessible from external to the computer system so that media bay devices can be easily be inserted into the media bays or removed from the media bays. The removability of the media bay devices allows a few media bays to support a variety of different types of devices in a flexible manner.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention has various advantages depending on the aspects of the invention being implemented. One advantage of the invention is that a user is provided with improved visual and textual notifications as to the status of the one or media bays of a computer system. Another advantage of the invention is that processing by the computer system is halted when a user improperly removes devices in a locked condition from media bays. Still another advantage of the invention is that control over multiple media bays is facilitated by providing multiple media bay drivers and a centralized location for media bay status information.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for indicating device status for a plurality of slots of a computer system, said method comprising:
   (a) determining whether the slots of the computer system are occupied by devices;
   (b) determining whether the slots are associated with a locked state; and
   (c) displaying an icon on a display screen of the computer system, the icon being based on whether the slots are occupied and whether the slots are associated with the locked state, and wherein the icon being displayed is a single icon that pertains to the plurality of slots.

2. A method as recited in claim 1, wherein the slots are media bays.

3. A method as recited in claim 2, wherein the icon is displayed on the display screen as a portion of a control strip.

4. A method for indicating device status for slots of a computer system, said method comprising:
   (a) determining whether the slots of the computer system are occupied by devices;
   (b) determining whether the slots are associated with a locked state;
   (c) displaying an icon on a display screen of the computer system, the icon being based on whether the slots are occupied and whether the slots are associated with the locked state;
   (d) determining types of devices that occupy the slots of the computer system; and
   (e) determining appropriate menu items for a menu based on the types of devices occupying the slots of the computer system.

5. A method as recited in claim 4, wherein the menu is a status-control menu for the slots.

6. A method as recited in claim 4, wherein said determining (e) of the appropriate menu items determines the appropriate menu items based on the types of devices occupying the slots of the computer system and whether the slots are associated with the locked state.

7. A method as recited in claim 6, wherein at least one of the menu items is a control item that if selected triggers a control action.

8. A method as recited in claim 7, wherein the control action operates to make the device occupying the slot removable.

9. A method as recited in claim 1, wherein the devices that are received by the slots include at least one of a CD-ROM drive, a floppy drive, a DVD drive, a hard drive, and a battery.

10. A graphical user interface for a computer system having a plurality of expansion bays, comprising:
    a control strip including a status icon for the plurality of expansion bays, the status icon visually indicating whether each of the plurality of expansion bays is occupied and whether the plurality of expansion bays is in a locked condition.

11. A graphical user interface as recited in claim 10, wherein said graphical user interface further comprises:
    a menu that is displayed upon selection of the status icon, the menu contains status or control information for the plurality of expansion bays.

12. A graphical user interface as recited in claim 11, wherein said menu includes a menu item for each of the expansion bays, and the menu item for each of the expansion bays is determined based on the types of devices occupying the expansion bays and whether the expansion bays are in the locked condition.

13. A method as recited in claim 12, wherein at least one of the menu items is a control item that if selected triggers a control action.

14. A computer readable medium containing program code for indicating device status for slots of a computer system, said computer readable medium comprising:
    program code for determining whether the slots of the computer system are occupied by devices;
    program code for determining whether the slots are associated with a locked state; and
    program code for displaying an icon on a display screen of the computer system, the icon being based on whether the slots are occupied and whether the slots are associated with the locked state;
    program code for determining types of devices that occupy the slots of the computer system; and
    program code for determining appropriate menu items for a menu based on the types of devices occupying the slots of the computer system.

* * * * *